United States Patent [19]

Riddle

[11] Patent Number: 4,524,849

[45] Date of Patent: Jun. 25, 1985

[54] TRIPOD

[75] Inventor: Ronald G. Riddle, Auckland, New Zealand

[73] Assignee: Terrence Arthur Riddle, Takapuna, New Zealand; a part interest

[21] Appl. No.: 619,321

[22] Filed: Jun. 11, 1984

[51] Int. Cl.³ .............................................. E06C 1/20
[52] U.S. Cl. .................................... 182/170; 182/171; 182/189
[58] Field of Search ............... 182/169, 170, 171, 189; 248/168, 170

[56] References Cited

U.S. PATENT DOCUMENTS

| 128,073 | 6/1872 | Roseborough | 248/168 |
|---|---|---|---|
| 234,389 | 11/1880 | Cannon | 182/189 |
| 785,277 | 3/1905 | Smith | 182/172 |
| 973,103 | 10/1910 | Boyd | 182/169 |
| 1,789,317 | 1/1931 | McLeish | 248/168 |
| 1,866,175 | 7/1932 | Rogers | 248/168 |
| 4,366,940 | 1/1983 | Vargas | 248/170 |

FOREIGN PATENT DOCUMENTS

| 554105 | 1/1957 | Italy | 182/170 |
|---|---|---|---|
| 56729 | 6/1936 | Norway | 182/170 |

Primary Examiner—Reinaldo P. Machado
Attorney, Agent, or Firm—Holman & Stern

[57] ABSTRACT

This invention relates to improvements in TRIPODS and more particularly to tripod connections.

The invention includes a link portion which links tripod leg portions either formed as legs for ground contact or as portions for engaging with legs for ground contact so as to enable the legs to be arranged into a tripod like configuration, converging toward one another and interconnected together adjacent an upper portion thereof.

The tripod can be in the form of shear legs, scaffolding supports, ladders and the like.

The tripod connection includes a link portion having one portion thereof pivotally connected in a captive manner with a first leg portion and second and third leg portions engaged also with the link portion and able to be positioned substantially remotely of the connection of the link and first leg portion on a curve portion whereby said link portion can be pivoted to a substantially "over center" position with a portion of said link portion remote from the pivot connection with said first leg portion bearing against said first leg portion with the second and third leg portions extending outwardly to provide the tripod like configuration, the assembly substantially securely mounted in that position.

At least the second and third leg portions are axially moveable relative to their connection with the link portion to engage on curved portions which assist in orientating said leg portions in the splay condition in use.

12 Claims, 5 Drawing Figures

TRIPOD

This invention relates to improvements in and relating to tripods and more particularly to a tripod connection.

Tripod arrangements are used in many instances where support is required such as in the form of trestles, ladders, stools and the like.

Traditional tripod arrangements generally provide stable support when used on flat ground however, these can become quite unstable and even dangerous when used on sloping ground, especially if the ground is undulating or steep.

Various solutions have been devised in attempts to overcome the problem; such as blocking one corner of the tripod, however, these are not completely satisfactory and can often lead to dangerous conditions of use.

It is an object of this invention to at least come some way in overcoming the abovementioned problems, or at least provide the public with a useful choice.

Other objects of this invention will become apparent from the following description.

According to one aspect of this invention, there is provided a tripod connection including a link portion pivotally mounted with leg portions, a first leg portion mounted to said link portion substantially oppositely of second and third leg portions, said leg portions and link portion pivotable into a condition whereby said leg portions are oriented converging towards one another adjacent said link portion in a tripod like condition, said link portion depending downwardly from the first leg pivot connection and generally upwardly of said second and third leg pivot connections, a portion of said link remote from said first leg pivot abutting an adjacent portion of said first leg portion to maintain said leg portions in the erected tripod like condition.

Other aspects of this invention which should be considered in all its novel aspects, will become apparent from the following description.

The preferred form of the invention will now be described with reference to the accompanying drawings, in which.

Figure 1:
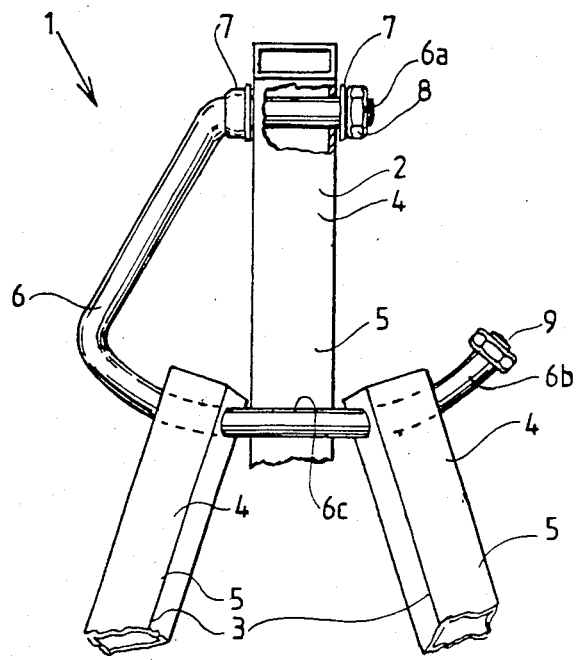
FIG. 1 is a substantially diagrammatic side elevation of the preferred form of the invention.

The invention in this preferred form of the invention includes a tripod connection for mounting leg portions of a tripod or tripod like assembly.

In this specification, the term "leg portions" is to be understood to refer to those portions which actually form the legs of a tripod, or portions connected with the legs of the tripod such as stubs for securement thereto and the like.

The tripod connection of this invention is in this preferred form of the invention formed in substantially robust and durable materials such as and preferably metals, for example stainless steel, mild steel and the like however, it is to be appreciated that in alternative arrangements other materials can be utilised without departing from the scope or spirit of the invention and depending on the requirements of the conditions of use.

The tripod connection is in this preferred embodiment provided to be used with a ladder, scaffolding support and the like however, it is to be understood that the tripod connection of this invention can be used in alternative arrangements where tripod or tripod like support is to be provided.

Now turning to the drawings, the tripod connection is generally indicated with reference to arrow 1 in the drawings.

The tripod connection is in the embodiment of the invention shown in the drawings, provided for mounting at the converging end portion 4 of tripod forming leg portions 5 hereinafter described as first leg portions 2 and second and third leg portions 3.

For the purposes of this description, second and third leg portions 3 are referred to collectively, as essentially they act in a similar but opposite manner in relation to the first leg portion 2.

Figure 2:
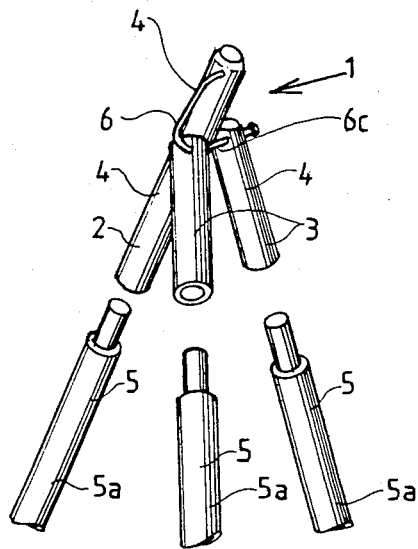
FIG. 2 is a substantially diagrammatic perspective view of the preferred form of the invention, in a condition securable with scaffolding like tubes.

In the preferred form of the invention with reference to FIGS. 1 and 2, the tripod connection 1 is provided with leg portions 5 as stub ends as is shown by FIG. 2 securable with leg portion extensions 5a for example by a spigot and socket engagement however, referring to the remaining embodiment of the invention, it will be seen that the leg portions 5 may be alternatively provided without departing from the invention.

Referring particularly to FIGS. 1 and 2, the tripod connection is in this preferred form of the invention provided with a linkage portion 6 which in this form of the invention is preferably provided in substantially robust metal bar material, for example stainless steel bar and the like of substantially round cross-section. The upper end portions 4 of the leg portions 5 are each pivotally connected with adjacent portions of the link portion 6 preferably via apertures provided in the end portions 4 of each leg portion 5, engaging over substantially round cross section portions of said linkage portion 6.

Preferably, the linkage portion 6 in this form of the invention is provided of a substantially angularly arranged open "C" shape and end portions 4 of said first leg portion 2 are engaged adjacent a first end portion 6a of said linkage portion 6 preferably between flange washers 7 and a removable securing means 8 such as and preferably a nut mounted on an externally screw-threaded portion of said end portion 6a.

It will be appreciated that the end portion 4 of the first leg portion 2 is pivotally mounted relative to said end portion 6a. The second and third leg portions 3 are in this form of the invention mounted to the link portion 6 substantially oppositely of said end portion 6a on preferably a substantially arcuate or curved portion 6b positioned substantially medially of an orthoganal line drawn through the end portion 6a with which the first leg portion 2a is mounted.

Preferably, the outer end of the curved portion 6b has a removable securement 9 mounted thereon, for example in the form of a nut, circlip and the like, and further, preferably the mid portion 6c of the curved portion 6b is provided as a substantially straight portion arranged substantially parallel yet spaced from the end portion 6a.

It will be appreciated that the leg portions 5 are each pivotable relative to the adjacent portion of the link portion 6 with which they are engaged via the apertures in the upper end portions 4 of the leg members 5 and further, that the linkage portion and thus the upper end portions 4 of the second and third leg portions 3 are pivotable relative to the first leg portions 2 so that mid portions 6c of said curved portion 6d may abut against an adjacent portion of said leg portion 4 when said linkage portion 6 depends downwardly therefrom substantially as in shown in the accompanying drawings.

In the preferred form of the invention, preferably the apertured engagement in the upper end portions 4 of the second and third leg portions 3 are reinforced for example by means of bushes and the like so as to provide additional wear resistance in that area.

Preferably, the engagement of the second and third leg portions with the like portion 6 is a substantially fine tolerance to enable substantial axial movement of said second and third leg portions 3 relative to at least said curved portion 6 and to enable the second and third leg portions 4 to be brought together and lie parallely in position adjacent the mid portion 6c. It will be appreciated that depending on their position on the arcuate curved portion 6b the second and third leg portions 3 will adopt a degree of angularity in relation to the first leg portion 2.

Referring to the preferred embodiment, the tripod as is shown with reference to FIG. 2 is preferably arranged into the erected condition with the leg portions 5 generally converging toward an upper portion and the tripod connecting means 1.

The second and third leg portions 3 are preferably slid outwardly in relation to the curved portion 6b so that they mount on at least partially the arcuate portion (as distinct from the straight portion 6c) and thus splay outwardly.

The legs are preferably extended substantially forwardly until their outer ends engage the ground surface and the first leg portion 2 is separated from the second and third leg portions 3 to form a tripod like arrangement.

Should the ground be uneven, the degree of angularity and splaying effect of the second and third leg portions 3 and indeed the first leg portion 2 can be altered to suit so that a tripod like assembly is provided and preferably the assembly is supported by maintaining the first leg portion 2 in a substantially held condition whereby it will be appreciated that the linkage portion 6 depends downwardly therefrom supporting the upper ends 4 of the second and third leg portions 3 directly therebeneath.

Upon the leg portions being engaged with the ground surface in the desired position, thereafter the operator merely releases the support of the first leg portion 2 which causes the upper end 4 of the first leg portion 2 to pivot towards the second and third leg portions 3 and cause the opposite portion (in this case the straight portion 6c) to impinge against portions of the first leg portion 2 in a substantially over-centre type of action to thus maintain the tripod like erection of the legs 5.

It will be appreciated that owing to the geometry of the curved portion 6b in relation to the upper end portions 4 of the second and third leg portions 3 and in relation to the pivotal mounting of the first leg portion 2, a certain degree of binding or jambing action occurs, upon the leg portions and linkages passing substantially over centre from the merely downwardly depending position described hereinbefore. This binding or jambing action assists in the holding of the leg portion 5 in a secure position by the apparatus of this invention.

Figure 3:
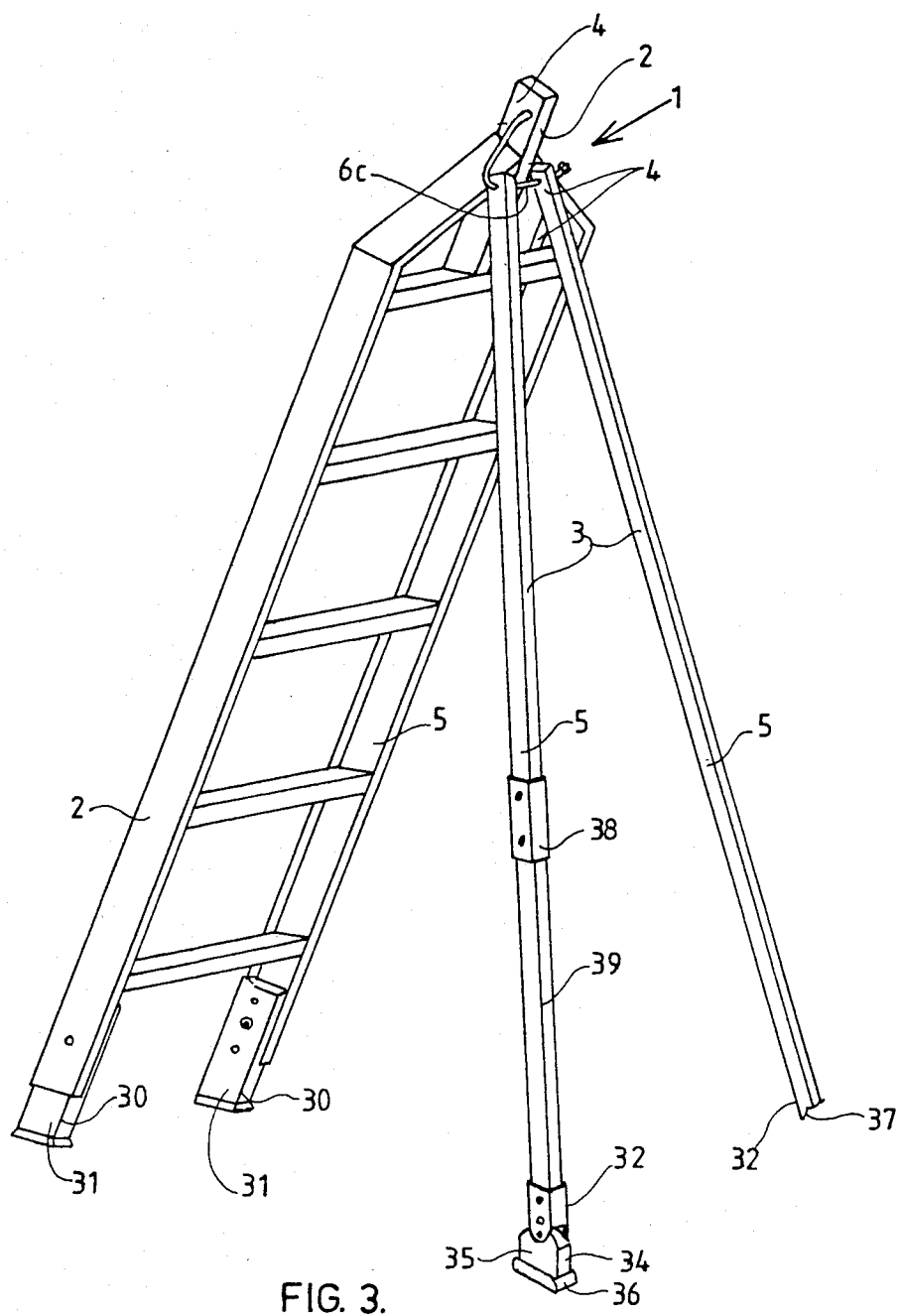
FIG. 3 is a substantially diagrammatic perspective view of an alternative embodiment of the invention.

Now referring to the remaining figures and the further embodiments, FIG. 3 discloses the arrangement of this invention wherein first leg portion 2 is provided in the form of a substantially traditional ladder-like arrangement and whereby the second and third leg portions 3 are provided as supporting legs so that a substantially step ladder like arrangement is provided.

To facilitate use of the arrangement over uneven ground, the ground engaging portions 30 of the first leg portion 2 are provided with substantially adjustable foot portions 31 thereon to facilitate convenient adjustment of the length of the spaced ground engagement portions 30 of the first leg portion 2.

Further, ground engaging portions 32 of the second and third leg portions 3 are also preferably provided with suitable ground engaging means 34 thereon, in the first instance a substantially adjustable foot member 35 is provided for example with a resilient and gripping pad portion 36 thereon to accommodate engagement with a variety of hard or otherwise slippery surfaces and in the second instance, a spike portion 37 on the other ground engaging portion 32.

Still further, the second or third leg portions 3 can be provided in a substantially telescoping or at least shortenable manner, and in this form of the invention, a socket means 38 is provided on at least one supporting leg portion 3 so as to enable radical shortening of that leg by removal of a lower segment 39 therefrom, should conditions of use so dictate.

Figure 4:
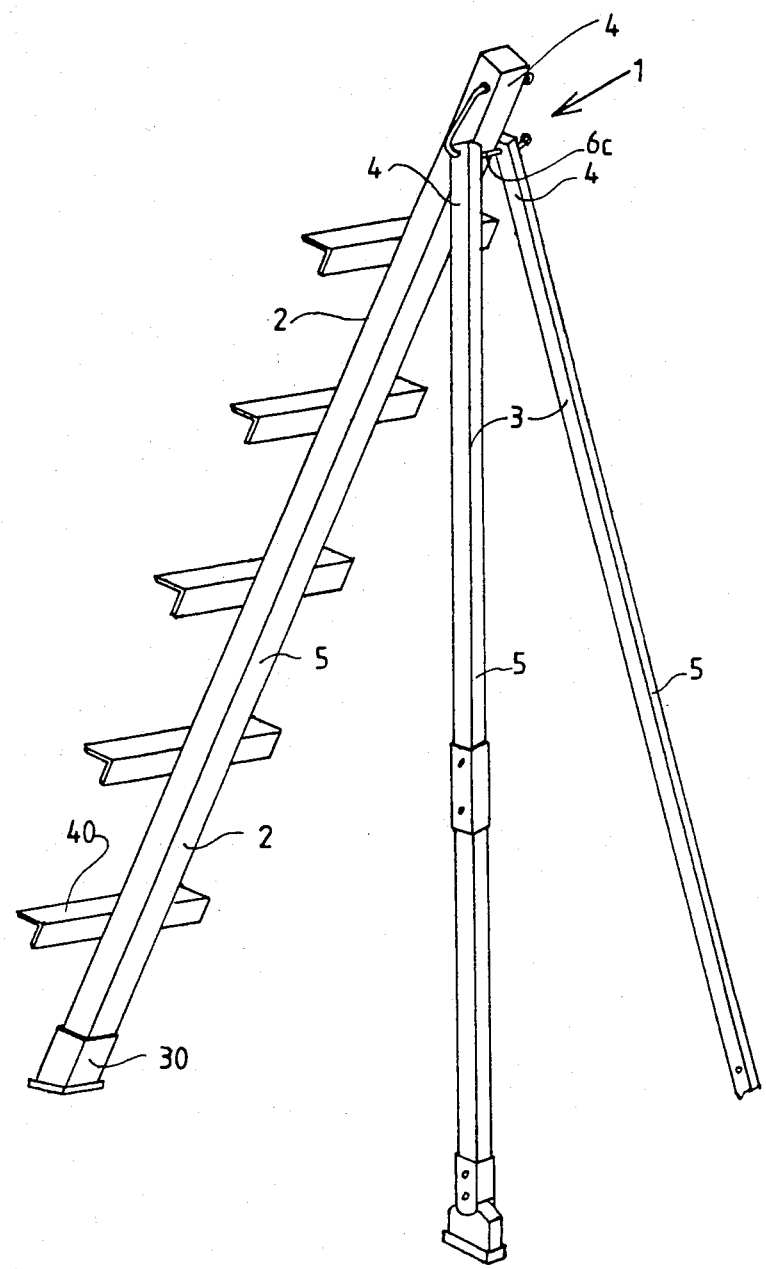
FIG. 4 is a substantially diagrammatic perspective view of a further embodiment of the embodiment of FIG. 3.

Referring to FIG. 4, this invention discloses an alternative embodiment of the invention of FIG. 3 whereby it will be appreciated that the first leg portion 2 is provided as a substantially singular upright member, with a single ground engaging portion 30 thereon, treads 40 being provided and engaged adjacent the mid portion thereof with an outer face of the first leg portion 2.

Figure 5:
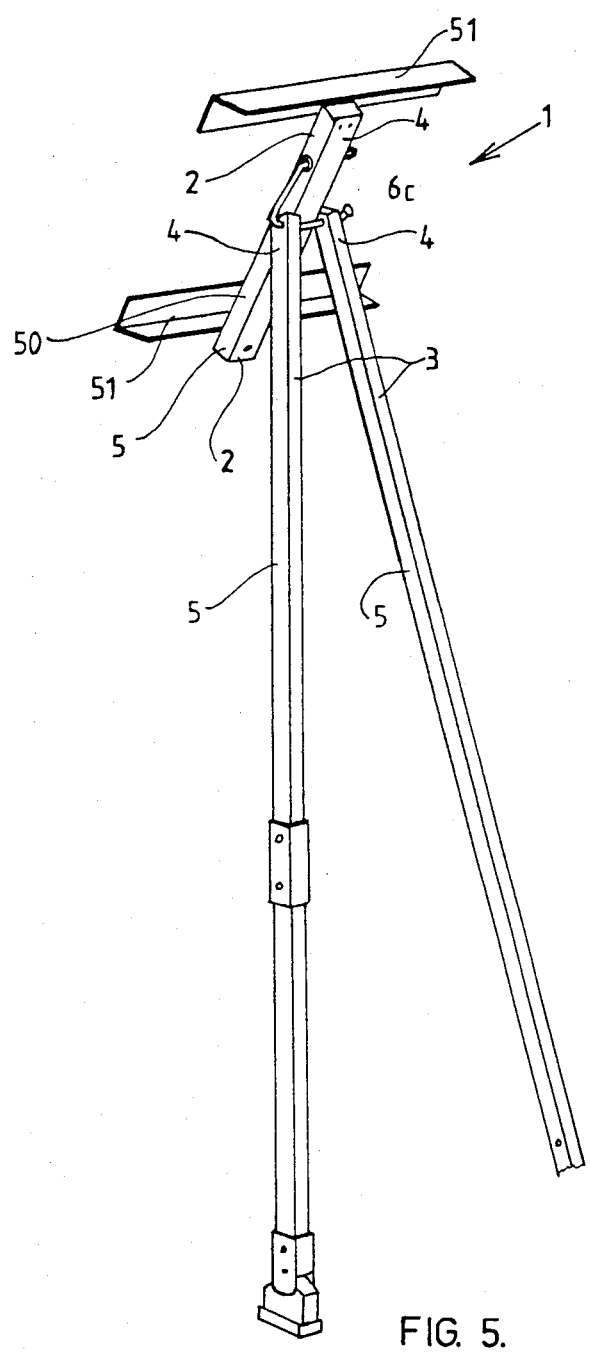
FIG. 5 is a substantially diagrammatic perspective view of an embodiment of this invention suitable for attachment to existing ladder assemblies.

Now turning to FIG. 5, in this form of the invention the first leg portion 5 is provided as a stub member 50 mounting sub frame members 51 for suitable engagement with a standard ladder and the like. This assembly, it will be appreciated, enables the apparatus of this invention to be utilised with any pre-existing or standard ladder assembly either as a permanently mounted arrangement or as an assembly which enables a ready and convenient fit should conditions so dictate.

Whilst the invention is described with reference to the link portion 6 being provided as a substantially open "C" shaped member, it is to be appreciated that the shape of the linkage portion 6 is variable and may in certain instances be formed as a substantially circular annular member or in the form of an oval or part oval structure.

It will be appreciated that the tripod connection of this invention facilitates the provision of a tripod which is readily collapsible when not required for use, yet which in use, enables the legs to orientate through a wide variety of angles to enable accommodation of uneven ground conditions and a wide variety of heights of the ground engaging portions of each leg portion 5.

It is to be appreciated that modifications may be made to the invention without departing from the scope or spirit of the invention as defined in the appended claims.

Thus, by this invention there is provided an improved tripod connection means and tripod including such connection means.

I claim:

1. A tripod connection including a link portion pivotally mounted with leg portions, a first leg portion mounted to one side of said link portion and second and third leg portions mounted to a substantially opposite side of said link portion, said legs and link portion pivotable into a condition where the said leg portions are mounted converging towards said link portion in a tripod like condition, said link member depending downwardly from the first leg pivot connection and generally upwardly of said second and third leg pivot connections, a portion of said link remote from said first leg pivot abutting an adjacent portion of said first leg portion to maintain said erected condition.

2. An apparatus as claimed in claim 1 wherein the link portion abutts against said first leg portion between said second and third leg portions.

3. Apparatus as claimed in claim 1 or claim 2 wherein said leg portion is captively mounted to said first leg portion.

4. Apparatus as claimed in claim 1 or claim 2, wherein said link portion includes a curved portion with which at least said second and third leg portions are engageable.

5. Apparatus as claimed in claim 4 wherein the mounting for said second and third portion includes a pair of curved portions separated by a substantially straight portion.

6. Apparatus as claimed in any one of the preceding claims, wherein the second and third leg portions are axially slidable relative to at least a portion of said link portion.

7. Apparatus as claimed in any one of the preceding claims, wherein the tolerances between the pivot connection of at least said second and third leg portions and said adjacent leg portions are such that said pivot connections bind or jamb when said link member is pivoted into said erected condition.

8. Apparatus as claimed in any one of the preceding claims wherein the tripod connection is provided as a leg portion and wherein said leg portions are engageable with tripod forming portions.

9. Apparatus as claimed in any one of the preceding claims wherein the first leg portion includes or is connectable with a ladder forming portion.

10. Apparatus as claimed in any one of the preceding claims wherein end portions of said leg portions are adapted for ground contact by way of length adjustment means.

11. Apparatus as claimed in any one of the preceding claims wherein outer end portions of said leg portions are adapted for ground contact by ground engaging means.

12. Apparatus as hereinbefore described with reference to the accompanying drawings.

* * * * *